United States Patent
Lombriser et al.

(10) Patent No.: US 10,248,976 B2
(45) Date of Patent: Apr. 2, 2019

(54) CONTENT ITEM SELECTION CRITERIA GENERATION

(71) Applicant: Google LLC, Mountain View, CA (US)

(72) Inventors: Clemens Lombriser, Zurich (CH); Ian James Leader, Zurich (CH); Hongji Bao, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 559 days.

(21) Appl. No.: 14/870,321

(22) Filed: Sep. 30, 2015

(65) Prior Publication Data

US 2016/0019605 A1  Jan. 21, 2016

Related U.S. Application Data

(63) Continuation of application No. 14/060,325, filed on Oct. 22, 2013, now abandoned.

(51) Int. Cl.
G06Q 30/00  (2012.01)
G06Q 30/02  (2012.01)
G05B 19/418 (2006.01)

(52) U.S. Cl.
CPC ................. *G06Q 30/0277* (2013.01)

(58) Field of Classification Search
USPC ................... 707/722, 3; 705/14.73
See application file for complete search history.

(56) References Cited

U.S. PATENT DOCUMENTS

| | | | |
|---|---|---|---|
| 8,572,099 B2 | 10/2013 | Baluja | |
| 2005/0222901 A1 | 10/2005 | Agarwal | |
| 2006/0116994 A1 * | 6/2006 | Jonker | G06F 17/30017 |
| 2006/0206516 A1 | 9/2006 | Mason | |
| 2010/0217695 A1 | 8/2010 | Alnahlawi | |
| 2010/0257023 A1 | 10/2010 | Kendall | |
| 2012/0051589 A1 | 3/2012 | Schloegel | |
| 2012/0323932 A1 | 12/2012 | Xin | |
| 2013/0159110 A1 | 6/2013 | Rajaram | |

(Continued)

OTHER PUBLICATIONS

"Guiding feature subset selection with an interactive visualization", May, T; Bannach, A. ; Davey, J. ; Ruppert, T. ; Kohlhammer, J. SBN electronic: 978-1-4673-0014-8. 2011 IEEE Conference on Visual Analytics Science and Technology (VAST) (pp. 111-120) (Year: 2011).*

*Primary Examiner* — Maria V Vanderhorst
(74) *Attorney, Agent, or Firm* — Fish & Richardson P.C.

(57) ABSTRACT

Selection of content selection criteria based on entities related by relationship dimensions. In one aspect, a method receives a selection of a seed entity described in entity relation data, the entity relation data defining instances of entities, and for each entity one or more relationship dimensions; generating a set of selected entities; iteratively updating the set of selected entities, each iteration comprising: determining a set of relationship dimensions from the entities in the set of selected entities, each relationship dimension in the set being selected from the one or more relationship dimensions of the entities in the set of selected entities, receiving a selection of one of the relationship dimensions and in response: determining a set of candidate entities from the relationship dimensions and in response to receiving a selection of one or more candidate entities, updating the set of selected entities to include the one or more candidate entities.

20 Claims, 13 Drawing Sheets

(56) References Cited

U.S. PATENT DOCUMENTS

2013/0185149 A1    7/2013  Koningstein
2013/0339344 A1*  12/2013  Nie ................... G06F 17/30731
                                                            707/722
2015/0046528 A1*   2/2015  Piepgrass .......... G06F 15/17306
                                                            709/204

* cited by examiner

Entity Selection — 410

Search for an entity in the entity relation data: [Mod AA] — 412

Or submit a landing page: [▼] — 414

Or specify an campaign or ad group: [▼] — 416

Selected entities: — 418

| Mod AA | X | Mod BB | X | Car Co A | X |
| Car Co B | X | Vehicle Safety Report | X | Pike's Peak Hill Climb | X |

Related Entities — 430 — These are related entities to the selected entities above. You may add them to the selected entities by dragging them to the selected entities box above.

( Get Related Entities ) — 432  for the relationship dimension [ Abstractions of Selected Entities ▼ ] — 434

| Fuel Efficient | X | SUVs | X | Vehicles | X |
| Hybrids | X | Car Co A | X | Car Co B | X |
| Computer Games | X | Compact Cars | X | Vehicle Safety Report | X |

View More

436

Content Selection Criteria — 450
Generate keywords and queries from the entity names and aliases ( Generate Keywords ) — 454    ( Generate Queries ) — 452

AA, BB, SUV, Car Co A, Car Co B, Pike's Peak, Pike's Peak Challenge, Hill Climb, Vehicle Safety, Crash Testing, Outdoors, Camping, Most Reliable, Safety Devices, Safety Ratings

FIG. 4H

CONTENT ITEM SELECTION CRITERIA GENERATION

CROSS-REFERENCE TO RELATED APPLICATIONS

This application is a continuation application of, and claims priority to, U.S. patent application Ser. No. 14/060,325, titled "CONTENT ITEM SELECTION CRITERIA GENERATION," filed on Oct. 22, 2013. The disclosure of the foregoing application is incorporated herein by reference in its entirety for all purposes.

BACKGROUND

This specification relates to generating selection criteria for selecting content.

The Internet provides access to a wide variety of resources. For example, video and/or audio files, as well as web pages for particular subjects, are accessible over the Internet. Access to these resources presents opportunities for content items, such as advertisements (or other content items) to be provided with the resources or with search results that identify the resources. For example, a web page can include "slots" (i.e., specified portions of the web page) in which advertisements (or other content items) can be presented. These slots can be defined in the web page or defined for presentation with a web page, for example, in a separate browser window. Advertisements or other content items that are presented in slots of a resource are selected for presentation by a content distribution system.

SUMMARY

In general, one innovative aspect of the subject matter described in this specification can be embodied in methods that include the actions of receiving a selection of a seed entity described in entity relation data, wherein the entity relation data defines instances of entities, and for each entity one or more relationship dimensions, each relationship dimension defining a relationship between the entity and one or more other entities; generating a set of selected entities, the set of selected entities being the seed entity; iteratively updating the set of selected entities, each iteration comprising: determining a set of relationship dimensions from the entities in the set of selected entities, each relationship dimension in the set being selected from the one or more relationship dimensions of the entities in the set of selected entities; receiving a selection of one of the relationship dimensions and in response: determining a set of candidate entities, each candidate entity in the set being an entity related to one of the entities in the set of selected entities by selected relationship dimension; and in response to receiving a selection of one or more candidate entities, updating the set of selected entities to include the one or more candidate entities. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter described in this specification facilitates exploration of relationships of entities among multiple different relationships. The different relationships are presented in a user interface, and are determined from a set of selected entities. Additional entities are identified by selected relationships to the selected entities and entity relation data. A user may add and remove entities from a set of selected entities, and iteratively revise the selected relationships and selected entities. The iterative process allows for the user to explore non-intuitive relationships among various entities and to define a concept focus from these various relationships and selected entities. In the case of advertisers, for example, these features allow the advertisers to define a concept focus that can be used to generate a robust but focused set of selection criteria for the concept focus. Because the concept focus is derived from the selected entities, and because the selected selection criteria are identified from emergent and possibly non-intuitive relationships, the selection criteria that are selected based on the concept focus will include selection criteria that an advertiser may have otherwise overlooked or failed to derive. A user interface facilitates the exploration of entity relations in an intuitive and fluid manner, which, in turn, allows the advertiser to concentrate on concept focus creation and exploration and to create and explore the concept focus quickly and efficiently.

Another advantage is that key metrics, e.g. estimates of what adding an entity to a candidate set would offer in terms of impressions, clicks, conversions, marginal cost per conversion, etc., can be shown for each addition to the selected set of entities so the advertiser can add only entities that meet certain metric targets, as well as concepts, instead of first having to add the selection criterion to the selected set of selection criteria to determine the estimated performance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4H are illustrations of a user interface that facilitates the generation of content item selection criteria

Like reference numbers and designations in the various drawings indicate like elements.

DETAILED DESCRIPTION

Overview

Figure 1:
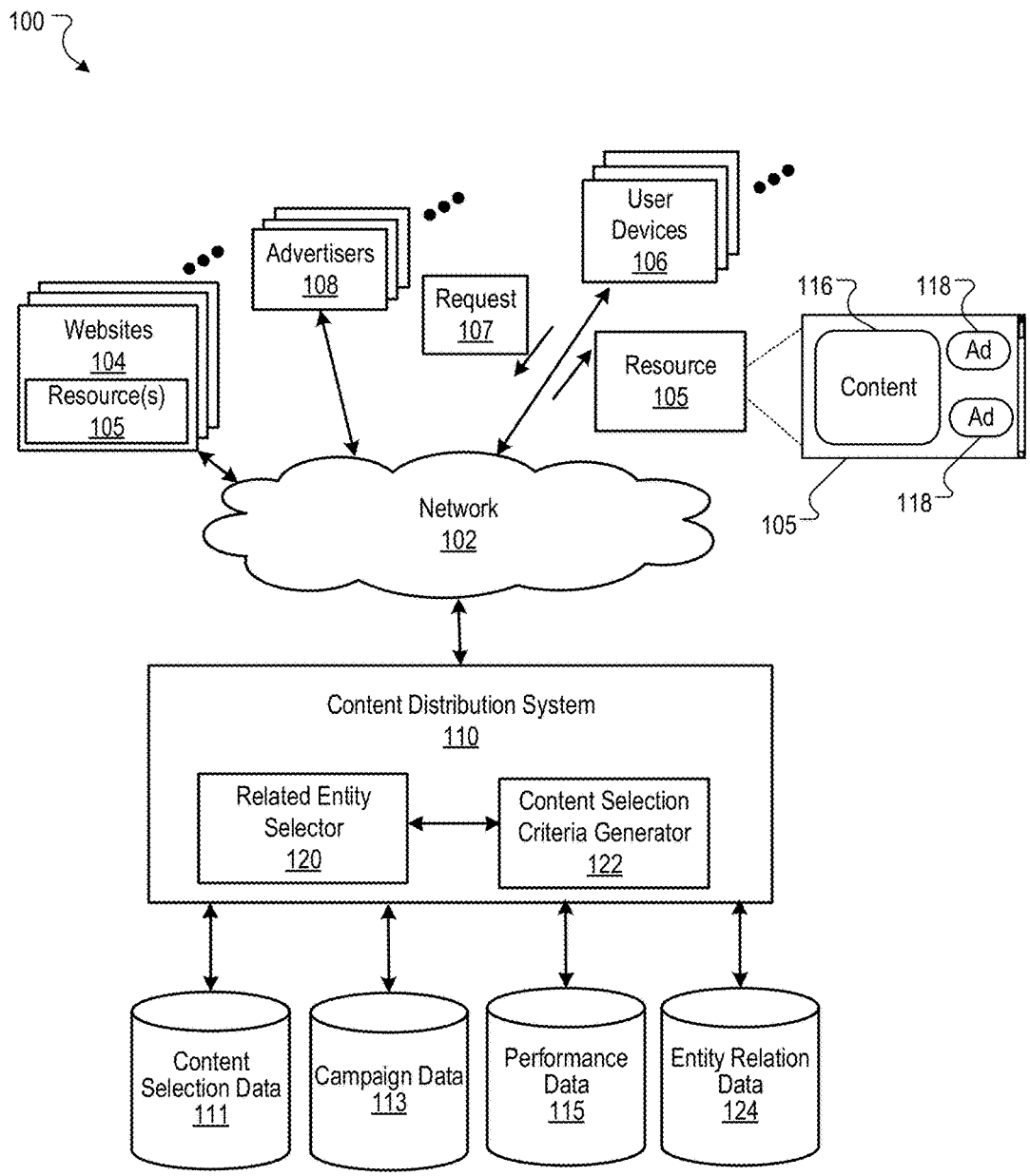
FIG. 1 is a block diagram of an example environment in which content is distributed to user devices.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, advertisers 108, and a content distribution system 110. The example environment 100 may include many different websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 107 that requests a resource 105 from a website 104. In turn, data representing the requested resource 105 can be provided to the user device 106 for presentation by the user device 106. The requested resource 105 can be, for example, a page of a website 104, web page from a social network, or another type of resource. The resource 105 includes resource content 116 that is presented on the user device 106. The resource 105 can also specify portions, e.g., content slots 118, in which content items, such as advertisements, can be presented. In the case of advertisements, the content slots 118 are often referred to as advertisement slots 118.

When a resource 105 is requested by a user device 106, execution of code associated with an advertisement slot 118 in the resource 105 initiates a request for an advertisement to populate the advertisement slot 118. The advertisement request can include characteristics of the advertisement slots 118 that are defined for the requested resource 105. For example, a reference (e.g., URL) to the requested resource 105 for which the advertisement slot 118 is defined, a size of the advertisement slot 118, and/or media types that are eligible for presentation in the advertisement slot 118 can be provided to the content distribution system 110. Similarly, keywords associated with a requested resource ("resource keywords") or entities that are referenced by the resource can also be provided to the content distribution system 110 to facilitate identification of advertisements that are relevant to the requested resource 105. The keywords may be derived from the content of the resource 105, or, in the case of the resource being a search results page, from the content of a query submitted by a user device 106. Other ways of deriving keywords for the request may also be used.

The advertisements (or other content items) that are provided in response to an advertisement request (or another content item request) are selected based on selection criteria for the advertisements. Selection criteria are a set of criteria upon which distribution of content items are conditioned. In some implementations, the selection criteria for a particular advertisement (or other content item) can include distribution keywords that must be matched (e.g., by resource keywords) in order for the advertisement to be eligible for presentation. The selection criteria can also specify a bid and/or budget for distributing the particular advertisement. Selection criteria can also be entity based and refer to entities, as that term is defined below, or a combination of entities and keywords, or other criteria that can be used to select content based on features that satisfy the criteria. For brevity and illustration, the selection criteria used in the examples that follow are keywords; however, the generation of content item selection criteria of types different from keywords can also be done by the processes described in the sections that follow.

In the case of advertisements, the content distribution system 110 includes a stores campaign data 113 and performance data 115. The campaign data 113 stores, for example, advertisements, selection criteria, and budgeting information for advertisers. The performance data 115 stores data indicating the performance of the advertisements that are served and for which selection data 111 the advertisements were served. Such performance data can include, for example, click through rates for advertisements, the number of impressions for advertisements, and the number of conversions for advertisements, both in the aggregate and on a per-query or per-keyword basis. Other performance data can also be stored.

The campaign data 113 and the performance data 115 are used as input parameters to an advertisement auction. In particular, the content distribution system 110, in response to each request for advertisements, conducts an auction to select advertisements that are provided in response to the request. The advertisements are ranked according to a score that, in some implementations, is proportional to a value based on an advertisement bid and one or more parameters specified in the performance data 115. The highest ranked advertisements resulting from the auction are selected and provided to the requesting user device 106 for display in the slots 118.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Related Entity Selection And Content Selection Criteria Generation

To help users generate content selection criteria, the content distribution system includes a related entity selector 120 and a content selection criteria generator 122. The related entity selector 120 facilitates the generation of a concept focus using entities. As used herein, entities are concepts such as persons, places, things, ideas, or features that are distinguishable from one another, e.g., based on context, and are the bases of an entity relation construct modeled by entity relation data 124. In particular, entities can represent or refer to specific items, such as particular products, services, companies, places, persons, etc.

In entity relation data, the relations between any two entities are represented by at least one relation linking the two entities, or multiple relations linking the two entities by one or more intermediate entities. Entities, as represented by the entity relation data, can be referenced by selection criteria or even be included in the selection criteria, depending on the types of selection criteria being used. For example, in the case of keywords, a keyword may refer to an entity, e.g., the keyword "beverages" and "soda" may derived from the entity "beverage" in the entity relation data.

A concept focus is a collection of entities selected from the entity relation construct. Once a concept focus is defined, the entities of the concept focus are provided to a content selection criteria generator 122 to generate content selection criteria.

To generate a concept focus, one or more seed entities are used to generate a set of selected entities. The seed entities can be selected manually by a user, or automatically retrieved from another source such as by processing a web page document, a web site, or even processing an advertisement group and advertising campaign. The selected set of entities is then iteratively updated by selecting, for each iteration, a relationship dimension that is identified based on the set of selected entities. For each iteration, the selected relationship dimension is used to identify additional entities that are related to one, some or all of the entities in the selected set of entities. Additional entities are then selected and added to the set of selected entities, and another iteration to update the set of selected entities may be performed.

Within each iteration the user can choose a new dimension of relatedness for new entity suggestions that expand or compact the currently selected set of entities. The related entity selector 120 provides visualizations of suggested new entities and relationship dimensions. From the visualization, the user may choose any number of entities to add to the selected set of entities. Entities may also be selected into a "negative" set that repels entities in relatedness computation.

Relationship dimensions are selected based on the entities in the selected set of entities, and thus differ for different entities. For example, an automobile may have particular relationships with other entities, e.g., relationship dimensions "other cars made by Car Co.," "other SUVs," "other hybrids," etc. Conversely, a beverage may have different relationship dimensions, such as "other low calorie drinks," "other carbonated beverages," etc. The related entity selector 120 may present all available relations dimensions for an entity set, or, alternatively, may present a proper subset of relationship dimensions. The proper subset may be suggested based on dimensional criteria, such as strongest relationships as indicated by an edge weight, a maximum node traversal in an entity relation graph, etc. Alternatively, a user may also search for dimensions, specify dimensions, or explore available dimensions by means of a graphical user interface.

Once the user indicates satisfaction with the set of selected entities, the set is used to define the concept focus of the user. The concept focus may then be used, for example, to generate keywords for advertising targeting.

Figure 2:
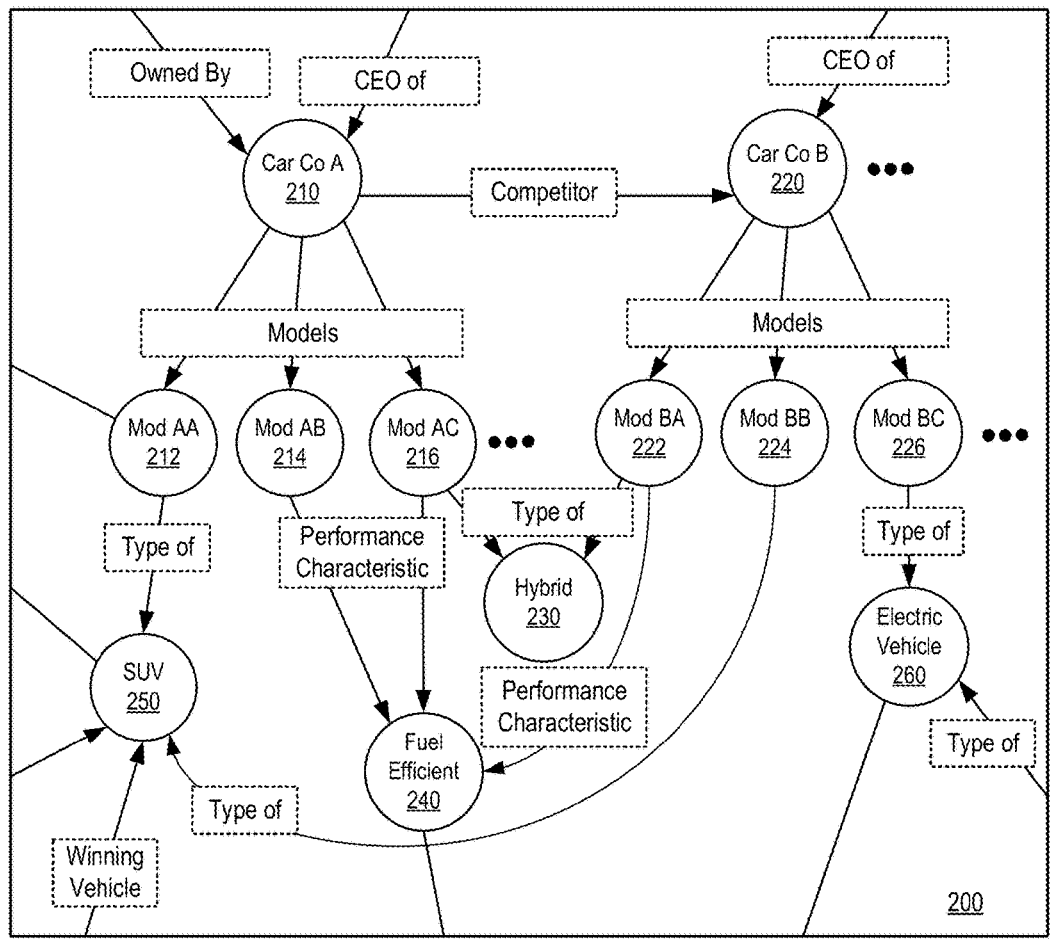
FIG. 2 is a block diagram of a portion of an example knowledge graph representation of entity relationship data.

The entity relation data can be any data that defines instances of entities and, for each entity, one or more relationship dimensions. Each relationship dimension, in turn, defines a relationship between the entity and one or more other entities. The relationship can be directly or indirectly defined. For example, one type of entity relation data that can be used is a knowledge graph. FIG. 2 is a block diagram of a portion of an example knowledge graph representation 200 of entity relationship data. The knowledge graph has nodes and edges. Each node in the knowledge graph represents a different entity, and pairs of nodes in the knowledge graph are connected by one or more edges. Each edge representing a relationship dimension that defines a relationship between the two entities represented by the pair of nodes, or several edges represent a series of relationships that connect two entities by one or more intermediate entities. As shown in FIG. 2, the edges are unidirectional, but in other variations the edges may be bidirectional.

For example, the knowledge graph 200 includes node 210 and 220 representing two car companies, Car Co A and Car Co B; nodes 212, 214, 216, 222, 224, and 226, representing car models, and nodes 230, 240, 250 and 260, representing the distinct car classes of Hybrid, Fuel Efficient, SUV, and Electric Vehicle, respectively. Nodes 212, 214, and 216 are connected to node 210 by the "models" relationship dimension, which means the cars Mod AA, Mod AB, and Mod AC are models made by Car Co A. Nodes 222, 224, and 226 are likewise connected to node 220.

Nodes 212 and 224 are connected to node 250, which indicated that car models Mod AA and Mod BB are SUVs; nodes 214, 216 and 222 are connected to node 240, which indicates the car models Mod AB, Mod AC and Mod BA are fuel efficient; nodes 216 and 222 are connected to node 230, which indicates the car models Mod AC and Mod BA are hybrids, and node 226 is connected to node 260, which indicates the car model Mod BC is an electric vehicle. Various other relationships dimensions are also shown in the graph 200. Although a hierarchy is emergent from the small portion shown, the graph 200 itself may be acyclic, and is not required to have cycles. Furthermore, the graph need not be a directed graph.

Figure 3:
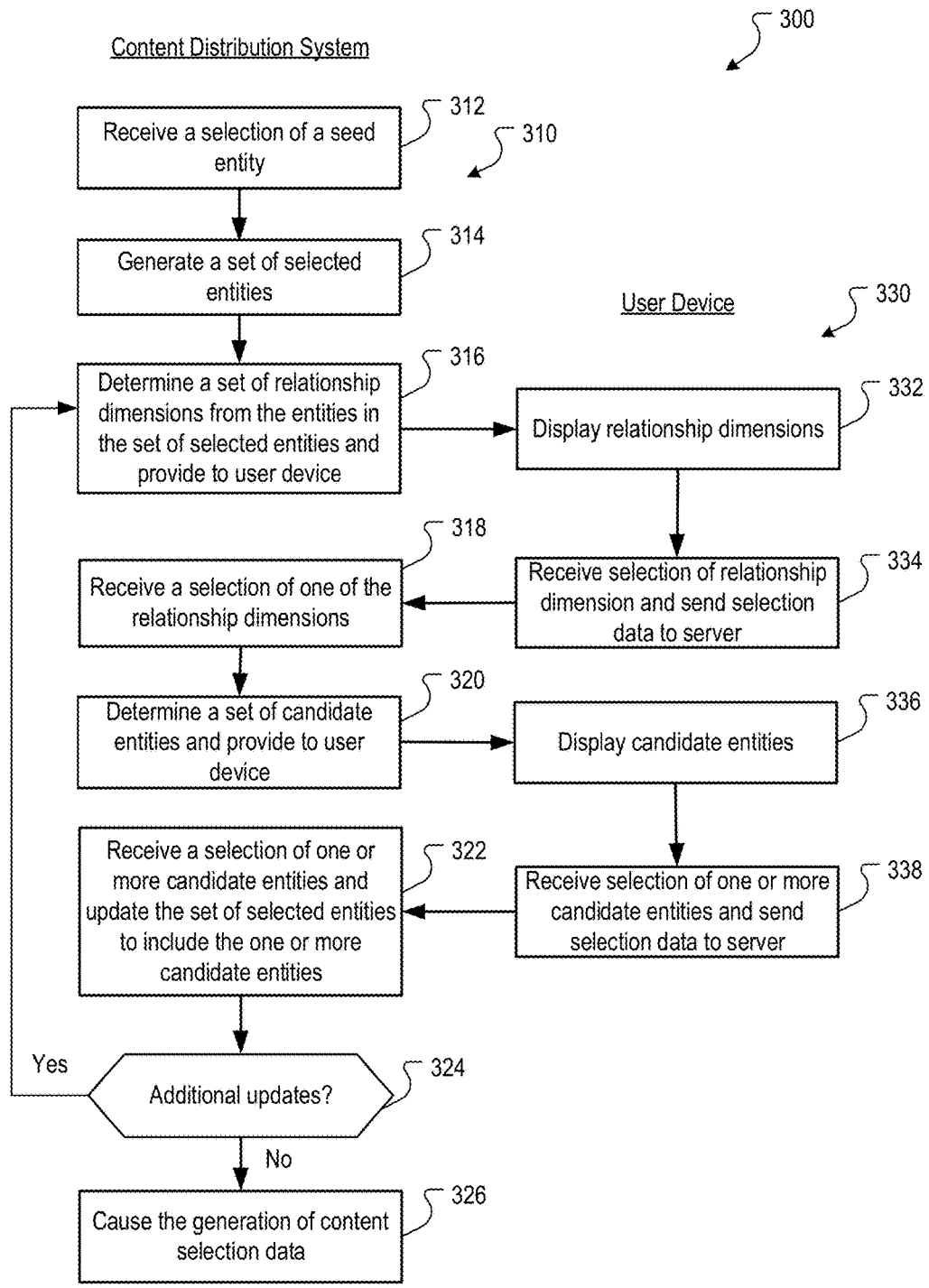
FIG. 3 is a flow diagram of example processes for generating content item selection criteria.

Generating a concept focus, and resulting concept item selection criteria, is described with reference to FIGS. 3 and 4A-4H below. In particular, FIG. 3 is a flow diagram of example processes 300 for generating content item selection criteria, and FIGS. 4A-4H are illustrations of a user interface 400 that facilitates the generation of content item selection criteria. The processes 300 include a first process 310 performed at the content distribution system 110, and a second process 330 performed at the user device. The processes 310 and 330, however, may also be combined and performed by a single computer device or system, provided the single computer device or system has access to entity relation data and other data, such as campaign data 113.

Figure 4A:
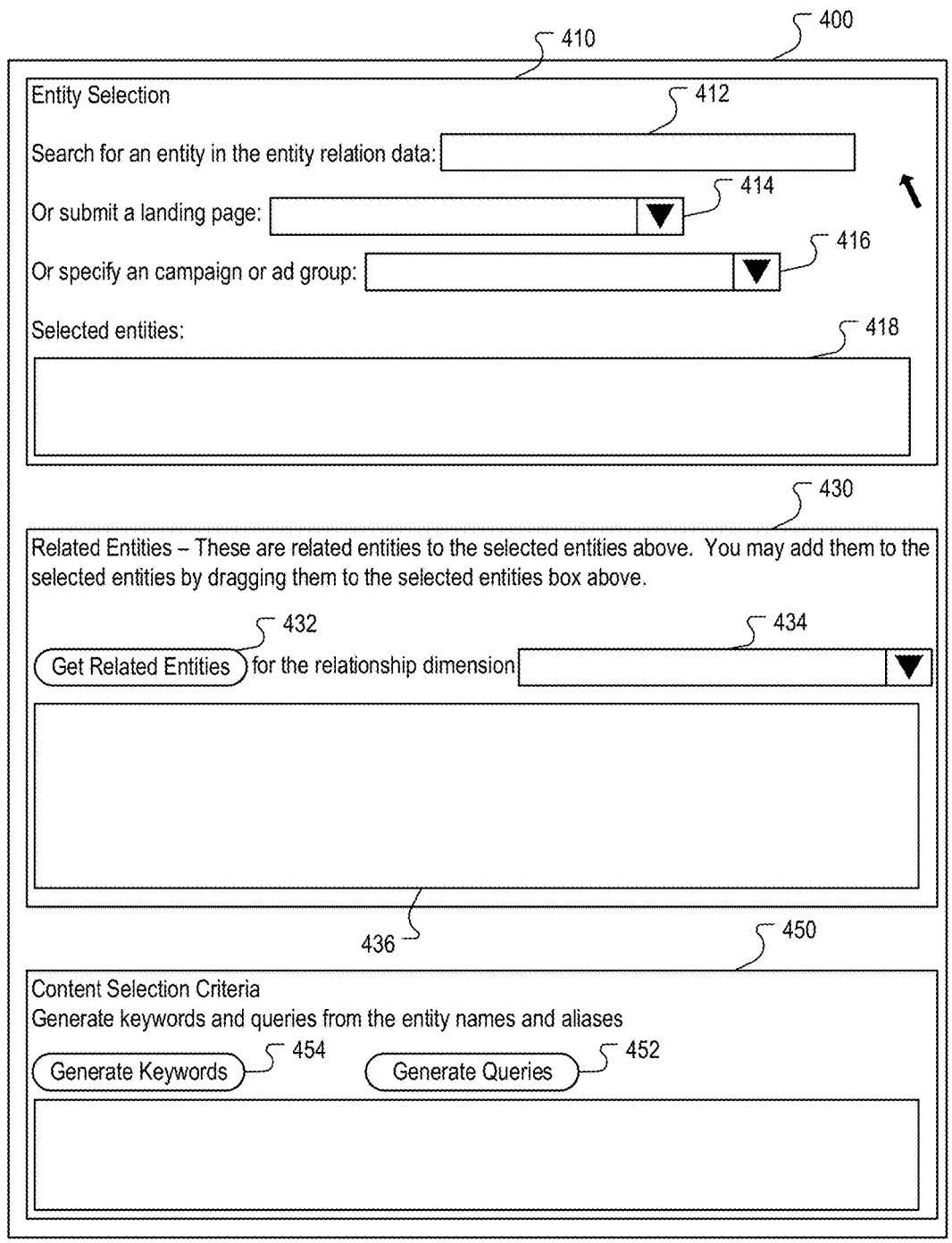

In operation, the content distribution system 110 provides an application, or a web page, to a user device 106. The user device 106 performs operations by executing instructions in the application or the web page to generate the user interface 400 of FIG. 4A. The user interface 400 includes an entity selection pane 410, a related entities pane 430, and a content selection criteria pane 450. In FIG. 4A, the user interface 400 is empty, indicating the user has not yet made any selections.

The entity selection pane 410 facilitates the selection of a seed entity and the adjustment of a selected set of entities. Input field 412 allows a user to search for an entity; input field 414 allows a user to specify a web page that can be processed to identify entities; and input field 416 allows a user to specify an advertising campaign or advertising group to identify entities. Other ways to initially identify one or more seed entities can also be used. Furthermore, the input fields 412, 414 and 416 can also be used during any iteration to add to a set of selected entities displayed in the selected entity field 418.

The related entities pane 430 includes a get related entities command 432, a relationship dimension field 434, and a candidate entity field 436. As will be explained below, a user can select a relationship dimension by use of the relationship dimension field 434, then invoke the get related entities command 432 to populate the candidate entity field 436 with candidate entities. Candidate entities in the candidate entity field 436 can then be selected for inclusion in the selected entities field 418.

The content selection criteria pane 450 is used to display content selection criteria, e.g., keywords, generated from the entity names of the related entities in the selected entities field 418. In the case of keyword selection criteria, the keywords may be generated from the entity names, aliases e.g., acronyms or other commonly used names for the entity, such as Sport Utility Vehicle, SUV, etc., common misspellings, or other associated strings. The user may accept or reject the individual criterion of the criteria.

Figure 4B:
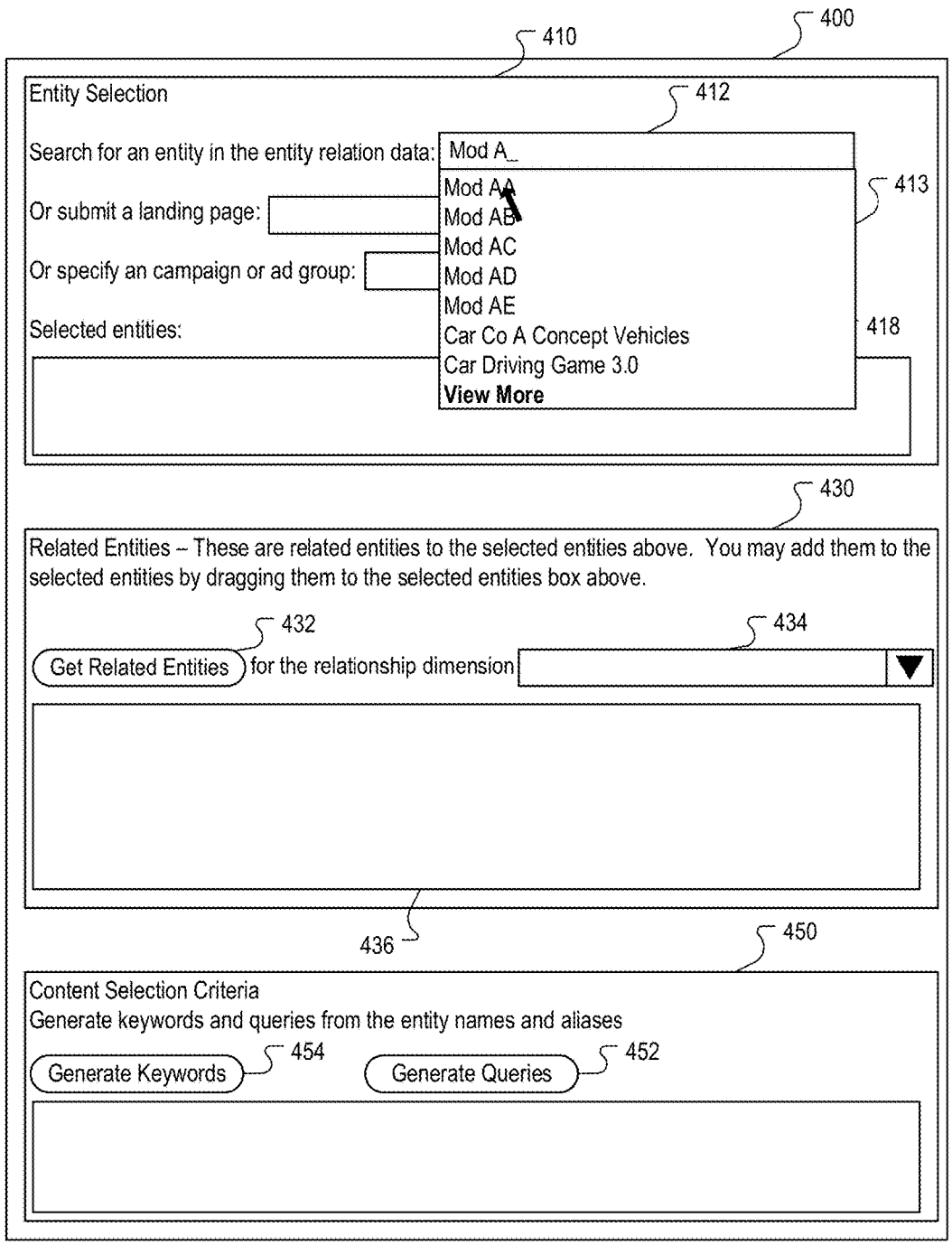

In operation, the process 310 receives a selection of a seed entity (312). As described above, the seed entity may be selected in a variety of ways. In FIG. 4B, for example, the user has entered a search for an entity. The user has entered the text "Mod A," and an entity search box 413 has appeared. The user selects the entity "Mod AA," as indicated by the cursor over the search result "Mod AA." The user device 106 sends data to the content distribution system 110 indicating the selection.

The process 310 generates a set of selected entities (314). The related entity selector 120, for example, generates a set of selected entities that includes only the seed entity. Because the first iteration populates the set of selected entities, only the seed entity is included in the set. Additional seed entities can also be selected, but for brevity the example description will use one seed entity, which, in this case, is the entity Mod AA, shown in the selected entity field 418 of FIG. 4C.

Figure 4C:
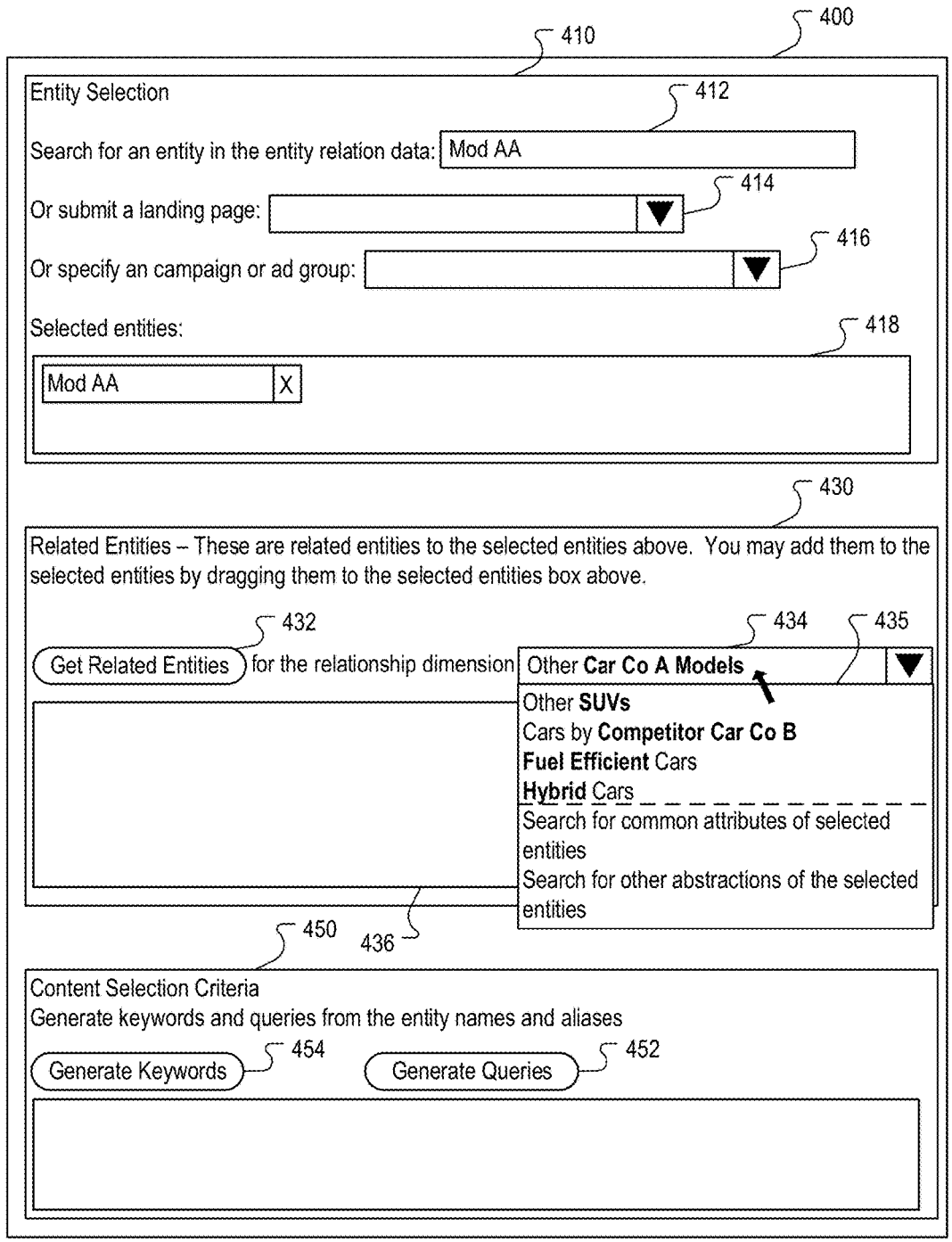
Figure 4D:
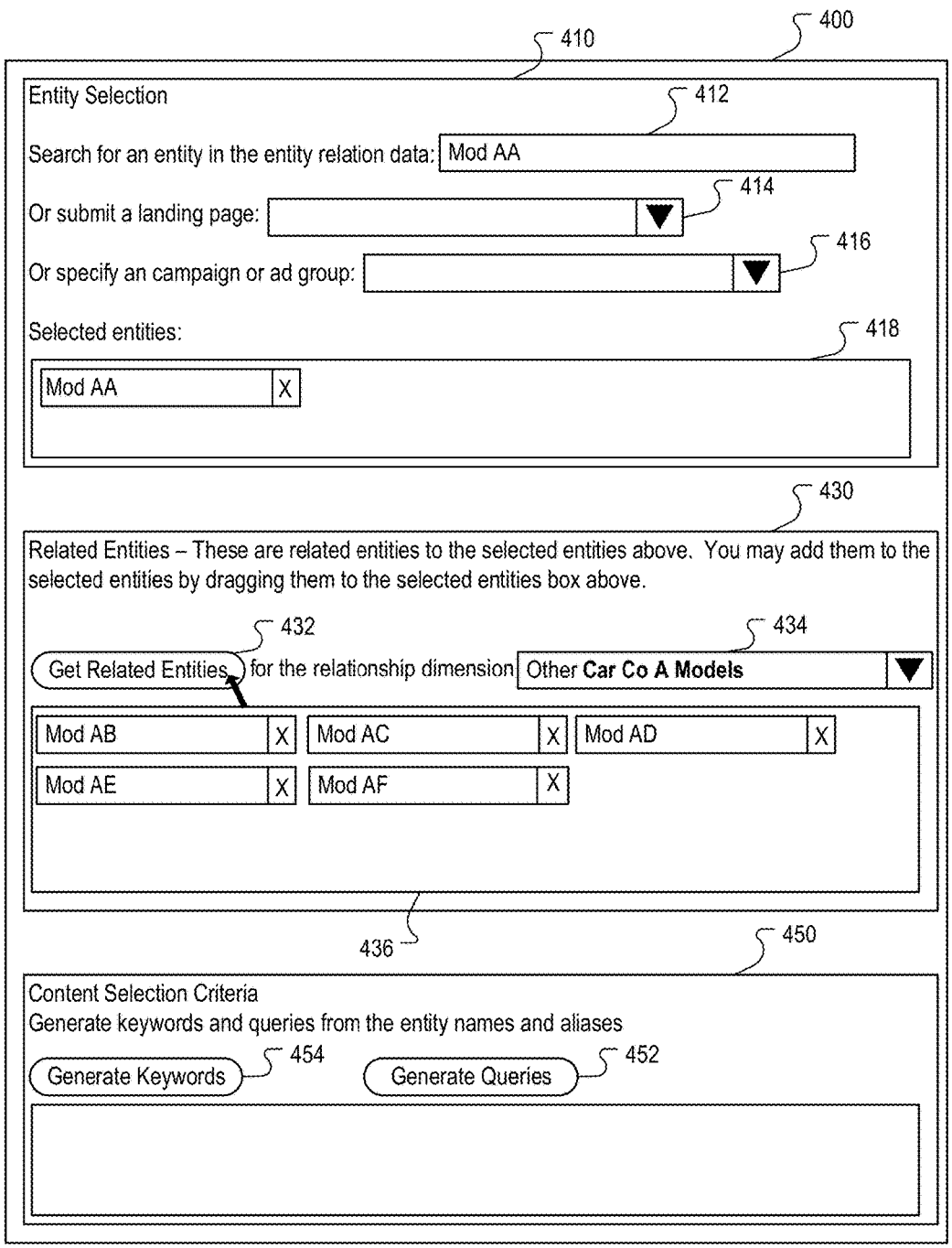

The process 310 determines a set of relationship dimensions from the entities in the set of selected entities and provides the set of relationship dimensions to a user device (316). At the user device, the process 330 displays relationship dimensions (332) and displays them. For example, as shown in FIG. 4C, a selection box 435 lists a set of relationship dimensions selected from the one or more relationship dimensions of the entities in the set of selected entities.

To select the relationship dimensions, the related entity detector 120, in some implementations, processes the entity relation data beginning at the node (or nodes) of the selected entities. For example, as shown in FIG. 2, the entity Mod AA is represented by node 212. Because the entity Mod AA is related to the "SUV" node 250 by a "Type of" relationship, the related entity detector 120 identifies the relationship "Type of SUV" as a relationship dimension. This is represented by the "Other SUVs" option displayed in the selection box 435. Likewise, because the entity Mod AA is related to the "Car Co A" node 210 by a "Model" relationship, the related entity detector 120 identifies the relationship "Car models of Car Co A" as a relationship dimension. This is represented by the "Other Car Co A Models" option displayed in the selection box 435.

These two relationship dimensions—"Car Co A" and "Other Car Co A Models"—are identified by direction relations to the node 212. However, additional relations can also be identified by traversing one or more nodes, up to a maximum of N nodes, where N=2, 3, or 4, for example. For example, the relationship dimensions "Cars by Competitor Car Co B" is identified by traversing the node 210 to node 220 by the "competitor" edge and the "Models" edges from nodes 210 to nodes 222, 224 and 226. Additional relations, such as "Fuel Efficient Cars" and "Hybrid" cars are identified by a similar process. Note that because the entity Mod AA, according to the knowledge graph 200, is neither a "Fuel Efficient" car nor a "Hybrid" car, the relationship dimensions as presented do not indicate that the Mod AA has a direct relation to either of these entities, i.e., the word "Other" is omitted from the relationship dimension in the selection box 435, while the word "Other" is included with the relationship dimension for SUVs.

In some implementations, the number N may vary by the type(s) of edges being traversed or the type of starting entity. For example, for geographic edges, the number N may be relatively larger, e.g., Alcatraz→San→Francisco→San Francisco Bay Area→Northern California→California→USA→North America→America. Conversely, for related products, the number of nodes may be fewer (e.g., 3) so as to avoid subject matter drift, e.g., Mod AA→SUV→Minivan for "related products" edges, etc.

Other types of relationship dimensions can also be presented. For example, common attributes of the selected entities can be specified, and the resulting entities that are selected are attributes of automobiles that are common to each entity in the selected entity field 418, such as "SUV."

Abstractions of the selected entities may include one or more abstractions of one or more entities to a larger class. For example, suppose the knowledge graph 200 includes the following relations, indicated by the notation ←[Relation]←, where:

Mod AA←[Type of]←SUV←[Type of]←Vehicle←[Engine]←Six Cylinder←[Type of]←F Gasoline Powered The entities for abstractions may thus include SUV, Vehicle, Six Cylinder, and Gasoline Powered, for example. Other types of relationship dimensions can also be used.

The number of relationship dimensions can, in some implementations, be limited to a maximum number, e.g., 5, 8, or 10. The order of the dimensions can, in some implementations, be based on prior selections by other users. For example, a potential relationship dimension is "CEO of Car Co A" based on the relationship dimension of "Models" linking node 212 to 210. However, this relationship dimension may be selected so infrequently that it is not shown in the selection box 435. In other implementations, the selection box 435 can be scrollable, and can show all relationship dimensions derived from traversing up to N maximum nodes from the nodes of the selected entity or entities. Other ways of ordering the relationship dimensions can also be used.

The order of the dimensions can also be based on edge weights (if included in the knowledge graph 200) that indicate a confidence in the accuracy of the relationship. For example, a relationship dimension corresponding to an edge weight of 0.98 would be rated higher than a relationship dimension corresponding to an edge weight of 0.58.

Figure 4E:
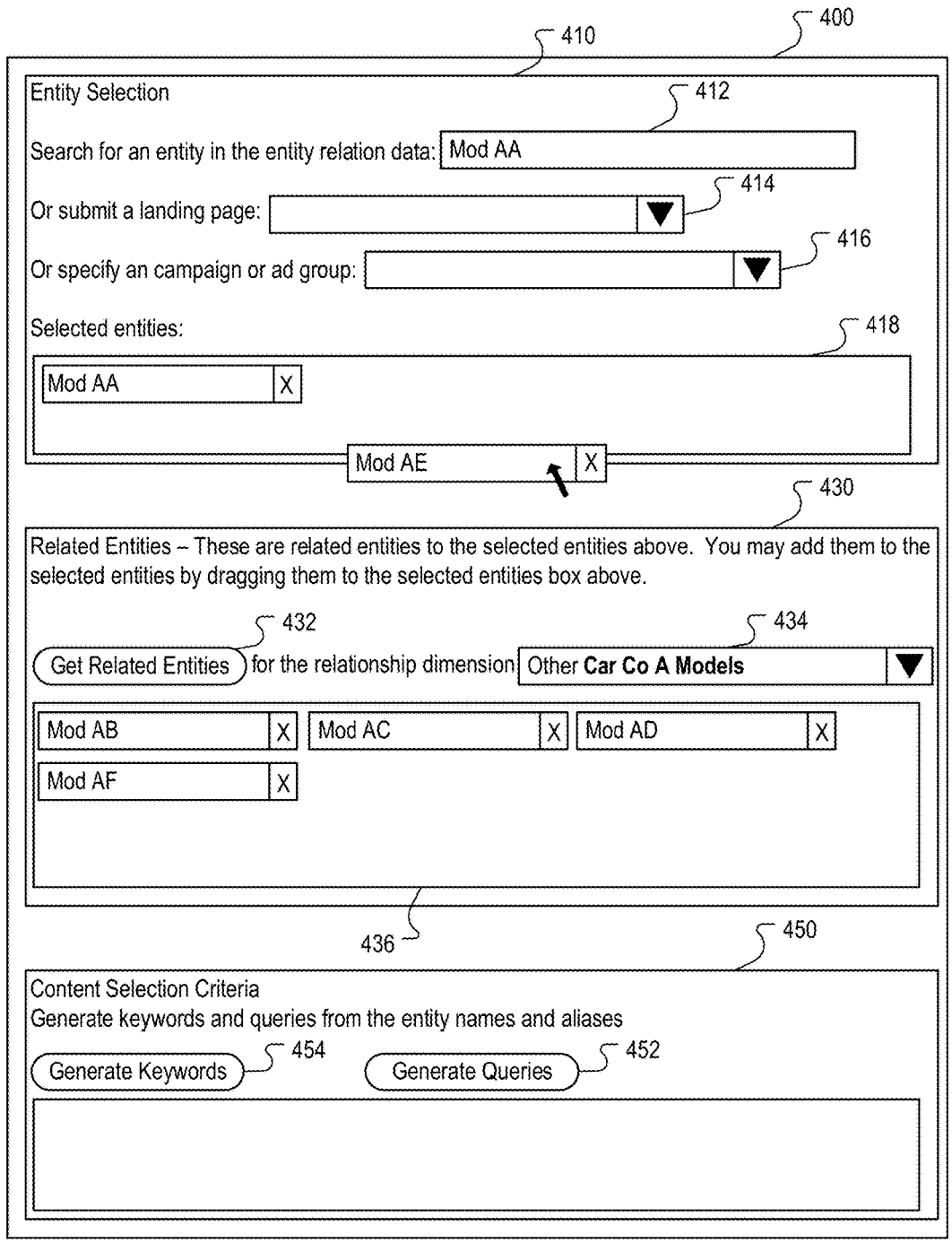

The process 330 receives selection of one or more candidate entities and sends selection data to server (336). For example, as shown in FIG. 4E, a user has selected the graphical representation of the entity Mod AE and is dragging it to the selected entities field 418. When the user deposits the entity Mod AE into the selected entities field 418, the action is interpreted as a selection of the candidate entity for inclusion in the selected entities. The user device receive a selection of a candidate entity and sends data to the server indicating the selection of the candidate entity (338). As an alternative, the user may also select entities using checkboxes and a button that copies the selected entities to the selected entities field, or some other user interface selection feature.

In response, the process 310 determines a set of candidate entities and provides the candidate entities to the user device (320). Each candidate entity in the set is an entity related to one of the entities in the set of selected entities by selected relationship dimension. For example, the related entity selector 120 selects all other entities connected to the node 210 by a "Models" link. In this case, entities Mod AB, Mod AC, Mod AD, Mod AE, and Mod AF are identified by traversing from the node 210 for each "Models" edge. Data describing the candidate entities are sent to the user device, where the process 330 displays candidate entities (334). For example, in FIG. 4D, the candidate entities Mod AB, Mod AC, Mod AD, Mod AE, and Mod AF are displayed in the candidate entity field 436.

The process 330 receives selection of one or more candidate entities and sends selection data to server (336). For example, as shown in FIG. 4E, a user has selected the graphical representation of the entity Mod AE and is dragging it to the selected entities field 418. When the user deposits the entity Mod AE into the selected entities field 418, the action is interpreted as a selection of the candidate entity for inclusion in the selected entities. The user device sends data to the server indicating the selection of the candidate entity. As an alternative, the user may also select entities using checkboxes and a button that copies the selected entities to the selected entities field, or some other user interface selection feature.

At the content distribution system, the process 310 receives the selection of one or more candidate entities and updates the set of selected entities to include the one or more candidate entities (322). The process 310 then determines whether additional updates to the set of selected entities are to be made (324). For example, if the user device sends a request for additional relationship dimensions based on the updated set of selected entities, then the process 310 returns to operation 316. Otherwise, the process 310 causes the generation of content selection data (326).

Figure 4F:
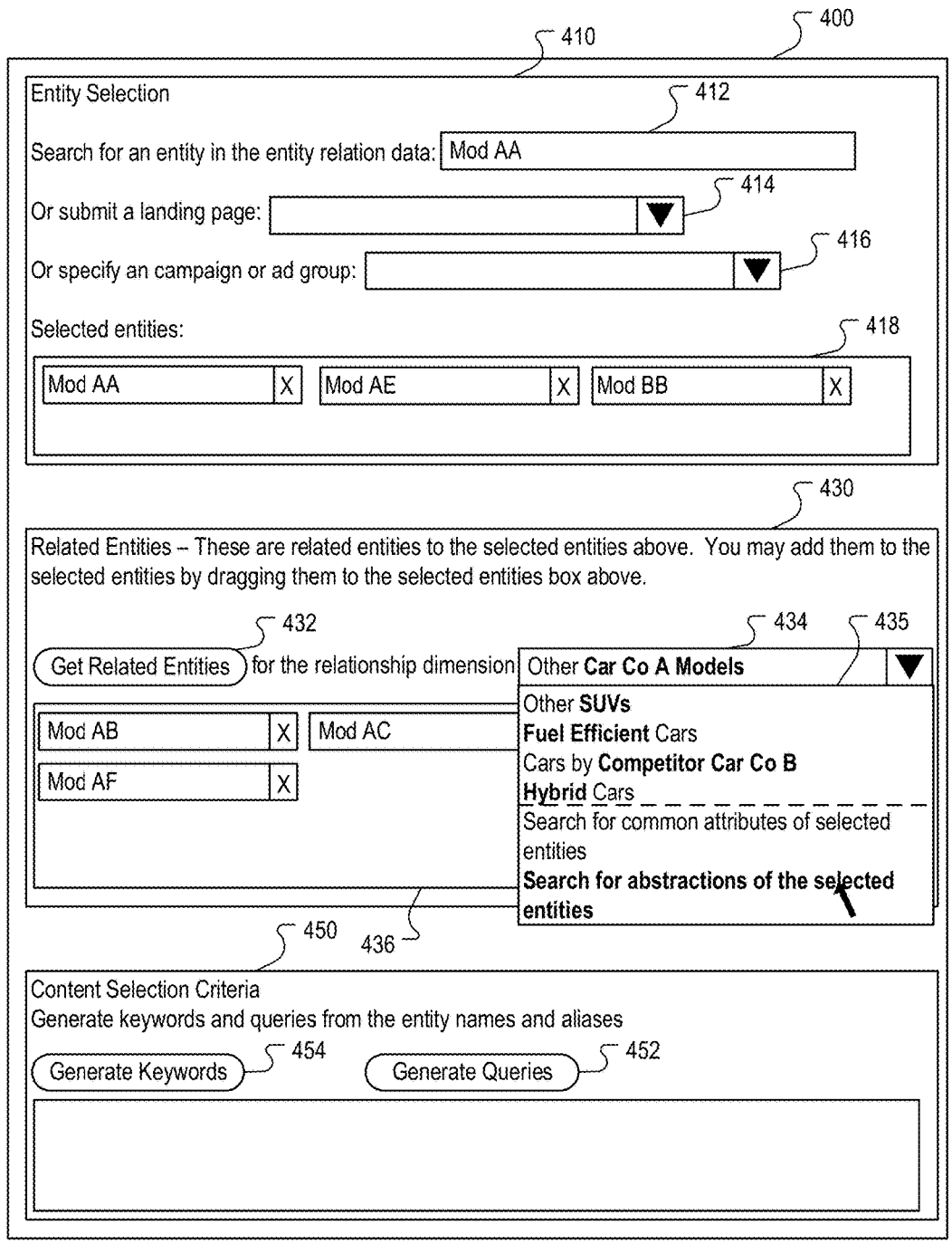
Figure 4G:
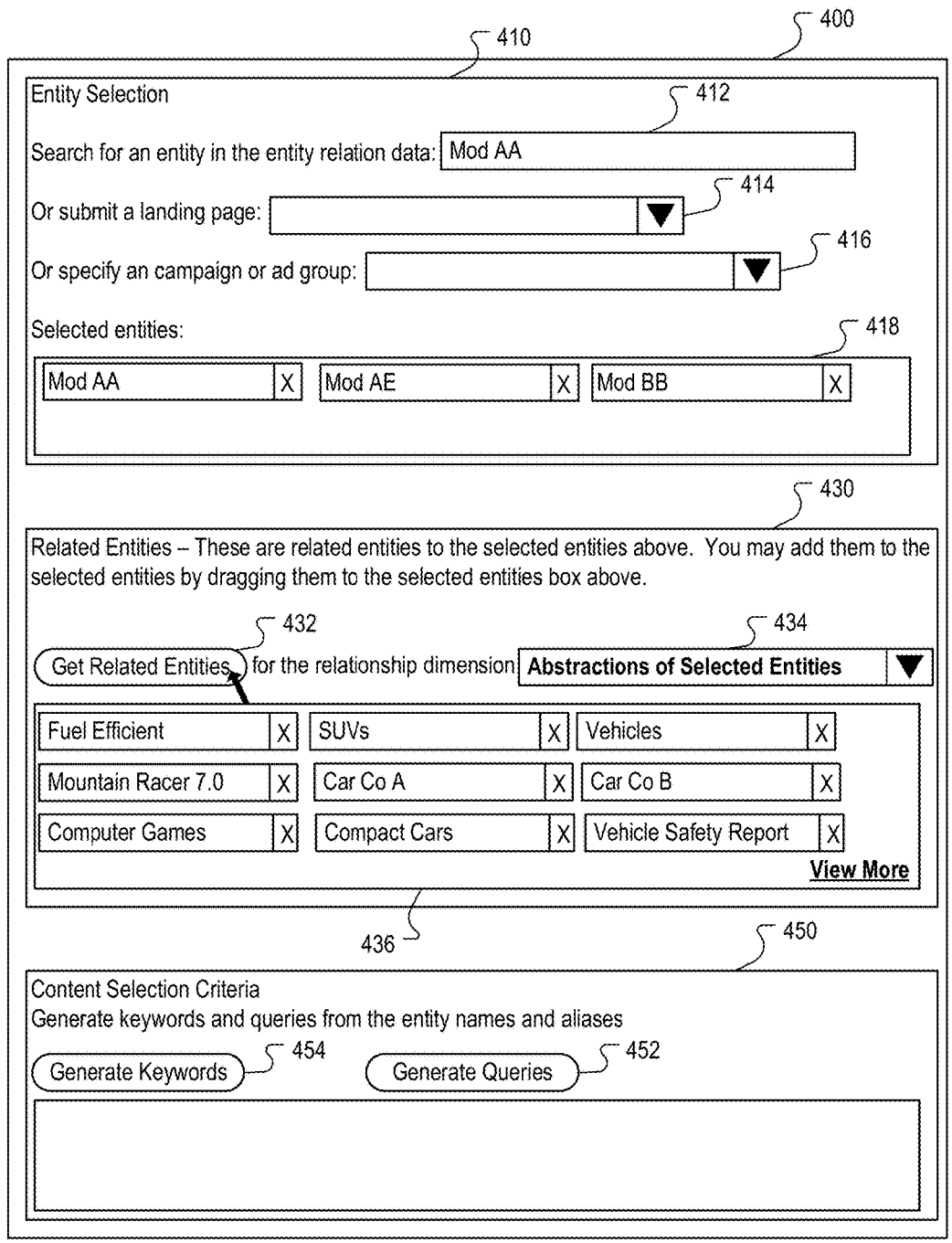

FIGS. 4F-4H illustrate a final iteration being performed after one or more prior iterations. In FIG. 4F, the user has selected the entities Mod AA, Mod AE and Mod BA, and is browsing available relationship dimensions in the selection box 435. The user selects the "Search for abstractions of the selected entities" in FIG. 4F, and then selects the "Get Related Entities" command 432. The resulting user interface 400, and the set of candidate entities, is shown in FIG. 4G. In FIG. 4G, the candidate set now includes entities such as "Fuel Efficient," "SUVs," and other car-related entities. However, additional entities, such as "Computer Games" and "Vehicle Safety Report," and potentially more entities, are also shown. The entity "Computer Games," may have been identified because one of the selected entities is the subject of a computer game, and this relationship is modeled in the knowledge graph as:

Mod AA←[Includes]←Mountain Racer 7.0←[Instance of]←Computer Game

Other related entities are also shown, such as the computer game "Mountain Racer 7.0," and other entities that relate to one or more of the selected entities in the selected entity field 418.

Suppose that the user is an advertiser that is attempting to identify keywords for the Mod AA SUV. The advertiser, however, was not aware that the Mod AA SUV was modeled in the game "Mountain Racer 7.0." By examining additional related entities, the advertiser discovers that the SUV was also the vehicle driven by a recent winner of Pike's Peak Hill Climb, which is also represented by an entity in the knowledge graph 200.

The advertiser is designing an ad group for placement of advertisements on outdoors and sporting related websites, and thus selects the "Pike's Peak Hill Climb" entity, along with several other entities, as shown in FIG. 4H. The advertiser has also removed the entity Model AE from the selected set of entities. Thereafter, the advertiser selects the "Generate keywords" command 454. In response, the user device 106 sends data to the content distribution system 110, which, in turn, causes the related entity selector 120 to submit the description of the selected set of entities to the content selection criteria generator 122. In response, the content selection criteria generator 122 generates a set of candidate content selection criterion based on the set of selected entities. In this case, a set of candidate keywords are generated based on the terms "Mod AA," "Mod BB," "Car Co A," "Car Co B," "Vehicle Safety Report," and "Pike's Peak Hill Climb." The advertiser can select some of the keywords, such as a subset, or all of the keywords, for inclusion in the content selection criteria for use by the content management system 110 to select and provide advertisements to user devices. Alternatively or in addition, the advertiser can continue to revise the set of related entities as described with reference to FIGS. 4A-4F. Other operations, such as generating queries by use of the "Generate Queries" command 452, can also be performed.

In some implementations, relationship dimensions can be defined as either positive or negative by the user, and multiple dimensions can be selected for determining candidate entities. Then, when determining a set of candidate entities, the related entity selector 120 identifies only candidate entities that are related to one or more of the entities in the set of selected entities by the positive relationship dimensions and not related to any entities in the set of selected entities by any of the negative relationship dimensions.

Additional Features And Variations

Figure 5:
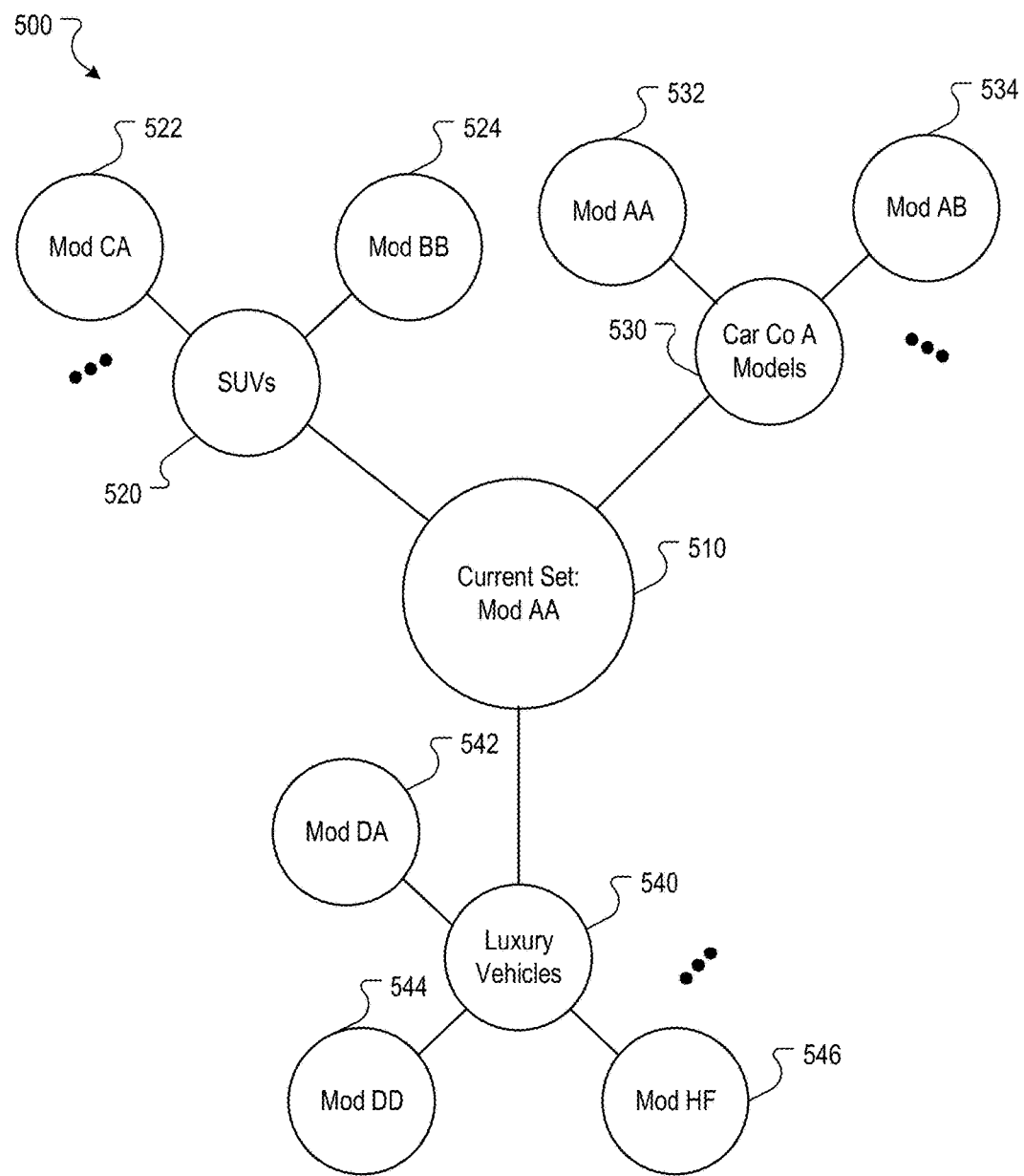
FIG. 5 is an entity relationship diagram of a selected entity set and relationship dimensions.

FIG. 5 is an entity relationship diagram 500 of a selected entity 510 set and relationship dimensions. The diagram 500, in some implementations, is used to visualize a most relevant set of relatedness dimensions and related entities for a selected entity. This can be presented instead of, or in addition to, the candidate entities in the candidate entity field 436. A user may select an entity from the graph to include it in the set of related entities.

Optionally, a user may traverse the diagram 500, and explore additional relationship dimensions and additional entities 520, 522, 524, 530, 532, 534, 540, 542 and 544 by moving the focus of the graph to a candidate entity. For example, a user may click on the node 546 for "Mod HF," and the node may move to the center of the graph 500. Thereafter, relationship dimensions up to N nodes, e.g., 2 nodes, separate from the node 546, may be explored.

Other visualizations can also be used.

In some implementations, the processes described above are language independent. In particular, a knowledge graph derived from relations discovered in a document corpus facilitates related entity exploration in a variety of different languages. Because a knowledge graph for a language may reflect the concept of relatedness by culture, the same process can be implemented in different languages yet at the same time avoid cultural biases.

The examples above are described in the context of a knowledge graph. However, other entity relation data can also be used instead of a knowledge graph. For example, in some implementations, the entity data can model class-instance pairs and attribute relations. Nodes of a first node type, each representing a distinct class of entities, are linked to nodes of a second type, each representing an instance of an entity that belongs to the class. Nodes of a third node type, each representing attributes of either an instance and/or a class, may link to one or more of the nodes of the first or second types. Each instance of an entity is thus related to one or more other entities by common attributes to which the entities are linked, by common attributes to which their respective classes are linked, and by common classes to which the entities belong.

Figure 6:
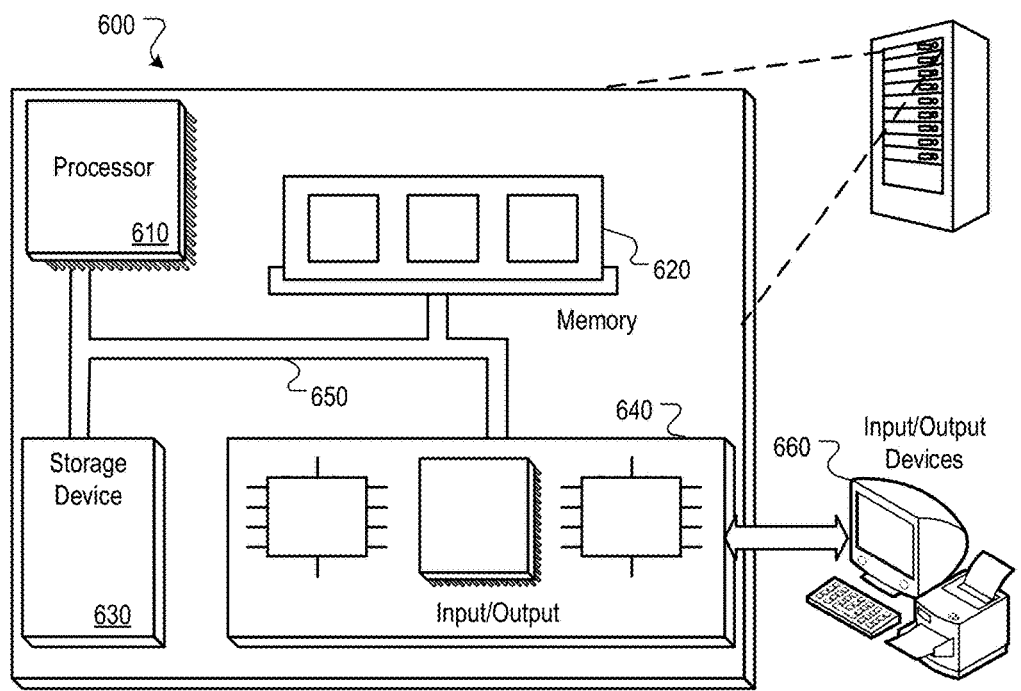
FIG. 6 is block diagram of an example computer system.

FIG. 6 is block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
   displaying, in a user interface of a user device:
      an entity selection pane that includes:
         an entity input field to input a seed entity selected by a user; and
         a selected entities display portion in which a set of selected entities are displayed;
      a related entities pane that includes:
         a relationship dimension field to select a relationship dimension from a set of relationship dimensions; and
         a candidate entity display portion in which a set of candidate entities are displayed and from which one or more candidate entities may be selected for inclusion in the set of selected entities and then displayed in the selected entities display portion; and
      a content selection criteria pane that displays content selection criteria generated from entity names of the set of selected entities displayed in the selected entities display portion;
   receiving, at the user device, a selection of a seed entity input in the entity input field and described in entity relation data, wherein the entity relation data defines instances of entities, and for each entity, one or more relationship dimensions, each relationship dimension defining a relationship between an entity and one or more other entities;

providing, to a data processing system external to the user device, the set of selected entities, the set of selected entities including one or more entities that include the seed entity;

iteratively updating, at the user device, the set of selected entities, each iteration comprising:

receiving, from the data processing system and displaying in the relationship dimension field of the related entities pane, a set of relationship dimensions determined from the entities in the set of selected entities, each relationship dimension in the set being selected from the one or more relationship dimensions of the entities in the set of selected entities, wherein the set of relationship dimensions determined for at least one iteration are different from a set of relationship dimensions determined for at least one other iteration, and, wherein the relationship dimensions include a textual description of each relationship dimension;

receiving, at the user device, a selection of one or more of the relationship dimensions in the set of relationship dimensions displayed in the relationship dimension field, and in response to the selection:

sending the selection of the one or more relationship dimensions to the data processing system that generates a set of candidate entities based on the relationship dimensions;

receiving from the data processing system, in response to the selection of one or more relationship dimensions that are sent to the data processing system, the set of candidate entities generated by the processing system, each candidate entity in the set being an entity related to one of the entities in the set of selected entities by the selected relationship dimensions;

displaying the set of candidate entities in the candidate entity display portion of the related entities pane at the user device; and receiving, at the user device, a selection of one or more candidate entities from among the set of candidate entities displayed in the candidate entity display portion of the related entities pane, and in response to the selection:

updating the set of selected entities to include the one or more candidate entities, and displaying, in the selected entities display portion of the entity selection pane, the updated set of selected entities as the set of selected entities;

sending, from the user device to the data processing system, a command to submit the set of selected entities to a content selection criteria generator to generate content selection criteria based on the set of selected entities; and receiving, from the data processing system, data described content selection criteria generated from entity names of the set of selected entities and displaying the content selection criteria in the content selection criteria pane.

2. The computer implemented method of claim 1, further comprising:

sending, to the data processing system, a request to generate content selection criteria based on the set of selected entities, the content selection criteria being criteria for selecting content to be provided to the user device, the request including the set of selected entities, and in response:

receiving, from the data processing system, a set of candidate content selection criterion based on the set of selected entities; and receiving, at the user device, selections of a subset of the candidate content selection criterion and sending the selection to the data processing system for storage as content selection criteria for use by a content management system to select and provide content to user devices in accordance with the content selection criteria.

3. The computer implemented method of claim 2, wherein:

the set of candidate content selection criterion comprises a set of keywords based on the set of selected entities; and the selected subset of the candidate content selection criterion are selected keywords.

4. The computer implemented method of claim 1, wherein the entity relation data comprises data defining a knowledge graph having a plurality of nodes and edges, wherein each node in the knowledge graph represents a different entity and pairs of nodes in the knowledge graph are connected by one or more edges, each edge representing a relationship dimension that defines a relationship between two entities represented by the pair of nodes.

5. The computer implemented method of claim 4, wherein the set of candidate entities comprise entities that are within a maximum number of N nodes of a node representing an entity connected by an edge representing the selected relationship dimension to another node representing one of the entities in the set of candidate entities, wherein N is less than the maximum number of nodes, exclusive of the node representing the entity, in the knowledge graph.

6. The computer implemented method of claim 5, where N is greater than 0.

7. The computer implemented method of claim 2, wherein:

the entity relation data comprises data defining instances of entities, and for each entity a plurality of attributes of the entity;

the set of relationship dimensions comprises a set of attributes from the entities in the set of selected entities; and a set of candidate entities comprises a set of entities not included in the set of selected entities and that each have at least one attribute in the set of attributes.

8. A user device, comprising:

a processor and a display; and a non-transitory computer readable medium storing instructs executable by the processor and that upon such execution cause the user device to perform operations comprising:

displaying, in a user interface of a user device:

an entity selection pane that includes:

an entity input field to input a seed entity selected by a user; and a selected entities display portion in which a set of selected entities are displayed;

a related entities pane that includes:

a relationship dimension field to select a relationship dimension from a set of relationship dimensions; and a candidate entity display portion in which a set of candidate entities are displayed and from which one or more candidate entities may be selected for inclusion in the set of selected entities and then displayed in the selected entities display portion; and a content selection criteria pane that displays content selection criteria generated from entity names of the set of selected entities displayed in the selected entities display portion;

receiving, at the user device, a selection of a seed entity input in the entity input field and described in entity relation data, wherein the entity relation data defines instances of entities, and for each entity one or more relationship dimensions, each relationship dimension defining a relationship between an entity and one or more other entities;

providing, to a data processing system external to the user device, the set of selected entities, the set of selected entities including one or more entities that include the seed entity;

iteratively updating, at the user device, the set of selected entities, each iteration comprising:

receiving, from the data processing system and displaying in the relationship dimension field of the related entities pane, a set of relationship dimensions determined from the entities in the set of selected entities, each relationship dimension in the set being selected from the one or more relationship dimensions of the entities in the set of selected entities, wherein the set of relationship dimensions determined for at least one iteration are different from a set of relationship dimensions determined for at least one other iteration, and, wherein the relationship dimensions include a textual description of each relationship dimension;

receiving, at the user device, a selection of one or more of the relationship dimensions in the set of relationship dimensions displayed in the relationship dimension field, and in response to the selection:

sending the selection of the one or more relationship dimensions to the data processing system that generates a set of candidate entities based on the relationship dimensions;

receiving from the data processing system, in response to the selection of one or more relationship dimensions that are sent to the data processing system, the set of candidate entities generated by the processing system, each candidate entity in the set being an entity related to one of the entities in the set of selected entities by the selected relationship dimensions;

displaying the set of candidate entities in the candidate entity display portion of the related entities pane at the user device; and receiving, at the user device, a selection of one or more candidate entities from among the set of candidate entities displayed in the candidate entity display portion of the related entities pane, and in response to the selection:

updating the set of selected entities to include the one or more candidate entities, and displaying, in the selected entities display portion of the entity selection pane, the updated set of selected entities as the set of selected entities;

sending, from the user device to the data processing system, a command to submit the set of selected entities to a content selection criteria generator to generate content selection criteria based on the set of selected entities; and receiving, from the data processing system, data described content selection criteria generated from entity names of the set of selected entities and displaying the content selection criteria in the content selection criteria pane.

9. The user device of claim 8, the operations further comprising:

sending, to the data processing system, a request to generate content selection criteria based on the set of selected entities, the content selection criteria being criteria for selecting content to be provided to the user device, the request including the set of selected entities, and in response:

receiving, from the data processing system, a set of candidate content selection criterion based on the set of selected entities; and receiving, at the user device, selections of a subset of the candidate content selection criterion and sending the selection to the data processing system for storage as content selection criteria for use by a content management system to select and provide content to user devices in accordance with the content selection criteria.

10. The user device of claim 9, wherein:

the set of candidate content selection criterion comprises a set of keywords based on the set of selected entities; and the selected subset of the candidate content selection criterion are selected keywords.

11. The user device of claim 8, wherein the entity relation data comprises data defining a knowledge graph having a plurality of nodes and edges, wherein each node in the knowledge graph represents a different entity and pairs of nodes in the knowledge graph are connected by one or more edges, each edge representing a relationship dimension that defines a relationship between two entities represented by the pair of nodes.

12. The user device of claim 11, wherein the set of candidate entities comprise entities that are within a maximum number of N nodes of a node representing an entity connected by an edge representing the selected relationship dimension to another node representing one of the entities in the set of candidate entities, wherein N is less than the maximum number of nodes, exclusive of the node representing the entity, in the knowledge graph.

13. The user device of claim 12, where N is greater than 0.

14. The user device of claim 9, wherein:

the entity relation data comprises data defining instances of entities, and for each entity a plurality of attributes of the entity;

the set of relationship dimensions comprises a set of attributes from the entities in the set of selected entities; and a set of candidate entities comprises a set of entities not included in the set of selected entities and that each have at least one attribute in the set of attributes.

15. A non-transitory computer readable medium storing instructs executable by a user device and that upon such execution cause the user device to perform operations comprising:

displaying, in a user interface of a user device:

an entity selection pane that includes:

an entity input field to input a seed entity selected by a user; and a selected entities display portion in which a set of selected entities are displayed;

a related entities pane that includes:
  a relationship dimension field to select a relationship dimension from a set of relationship dimensions; and
  a candidate entity display portion in which a set of candidate entities are displayed and from which one or more candidate entities may be selected for inclusion in the set of selected entities and then displayed in the selected entities display portion; and
  a content selection criteria pane that displays content selection criteria generated from entity names of the set of selected entities displayed in the selected entities display portion;
receiving, at the user device, a selection of a seed entity input in the entity input field and described in entity relation data, wherein the entity relation data defines instances of entities, and for each entity, one or more relationship dimensions, each relationship dimension defining a relationship between an entity and one or more other entities;
providing, to a data processing system external to the user device, the set of selected entities, the set of selected entities including one or more entities that include the seed entity;
iteratively updating, at the user device, the set of selected entities, each iteration comprising:
  receiving, from the data processing system and displaying in the relationship dimension field of the related entities pane, a set of relationship dimensions determined from the entities in the set of selected entities, each relationship dimension in the set being selected from the one or more relationship dimensions of the entities in the set of selected entities, wherein the set of relationship dimensions determined for at least one iteration are different from a set of relationship dimensions determined for at least one other iteration, and, wherein the relationship dimensions include a textual description of each relationship dimension;
  receiving, at the user device, a selection of one or more of the relationship dimensions in the set of relationship dimensions displayed in the relationship dimension field, and in response to the selection:
    sending the selection of the one or more relationship dimensions to the data processing system that generates a set of candidate entities based on the relationship dimensions;
    receiving from the data processing system, in response to the selection of one or more relationship dimensions that are sent to the data processing system, the set of candidate entities generated by the processing system, each candidate entity in the set being an entity related to one of the entities in the set of selected entities by the selected relationship dimensions;
    displaying the set of candidate entities in the candidate entity display portion of the related entities pane at the user device; and
  receiving, at the user device, a selection of one or more candidate entities from among the set of candidate entities displayed in the candidate entity display portion of the related entities pane, and in response to the selection:
    updating the set of selected entities to include the one or more candidate entities, and
    displaying, in the selected entities display portion of the entity selection pane, the updated set of selected entities as the set of selected entities;
sending, from the user device to the data processing system, a command to submit the set of selected entities to a content selection criteria generator to generate content selection criteria based on the set of selected entities; and
receiving, from the data processing system, data described content selection criteria generated from entity names of the set of selected entities and displaying the content selection criteria in the content selection criteria pane.

16. The non-transitory computer readable medium of claim 15, the operations further comprising:
  sending, to the data processing system, a request to generate content selection criteria based on the set of selected entities, the content selection criteria being criteria for selecting content to be provided to the user device, the request including the set of selected entities, and in response:
    receiving, from the data processing system, a set of candidate content selection criterion based on the set of selected entities; and
    receiving, at the user device, selections of a subset of the candidate content selection criterion and sending the selection to the data processing system for storage as content selection criteria for use by a content management system to select and provide content to user devices in accordance with the content selection criteria.

17. The non-transitory computer readable medium of claim 16, wherein:
  the set of candidate content selection criterion comprises a set of keywords based on the set of selected entities; and
  the selected subset of the candidate content selection criterion are selected keywords.

18. The non-transitory computer readable medium of claim 15, wherein the entity relation data comprises data defining a knowledge graph having a plurality of nodes and edges, wherein each node in the knowledge graph represents a different entity and pairs of nodes in the knowledge graph are connected by one or more edges, each edge representing a relationship dimension that defines a relationship between two entities represented by the pair of nodes.

19. The non-transitory computer readable medium of claim 18, wherein the set of candidate entities comprise entities that are within a maximum number of N nodes of a node representing an entity connected by an edge representing the selected relationship dimension to another node representing one of the entities in the set of candidate entities, wherein N is less than the maximum number of nodes, exclusive of the node representing the entity, in the knowledge graph.

20. The non-transitory computer readable medium of claim 16, wherein:
  the entity relation data comprises data defining instances of entities, and for each entity a plurality of attributes of the entity;
  the set of relationship dimensions comprises a set of attributes from the entities in the set of selected entities; and
  a set of candidate entities comprises a set of entities not included in the set of selected entities and that each have at least one attribute in the set of attributes.

* * * * *

UNITED STATES PATENT AND TRADEMARK OFFICE
CERTIFICATE OF CORRECTION

PATENT NO. : 10,248,976 B2
APPLICATION NO. : 14/870321
DATED : April 2, 2019
INVENTOR(S) : Lombriser et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 621 days.

Signed and Sealed this
Second Day of June, 2020

Andrei Iancu
*Director of the United States Patent and Trademark Office*